United States Patent

Iijima et al.

[15] 3,688,267

[45] Aug. 29, 1972

[54] PATTERN IDENTIFICATION SYSTEMS OPERATING BY THE MULTIPLE SIMILARITY METHOD

[72] Inventors: Taizo Iijima, Tokyo-to; Kenichi Mori, Kawasaki, both of Japan

[73] Assignees: Kogyo Gijutsuin, a.k.a. "Agency of Industrial Science and Technology, Ministry of International Trade and Industry, Japanese Government,", Tokyo-to; Tokyo Shibaura Denki Kabushiki Kaisha, a.k.a. Tokyo Shibaura Electric Co., Ltd., Kawasaki-shi, Japan; part interest to each

[22] Filed: Nov. 2, 1970

[21] Appl. No.: 85,916

[30] Foreign Application Priority Data

Nov. 5, 1969 Japan ......................44/88109

[52] U.S. Cl.............340/146.3Q, 340/146.3 G, 340/146.3 MA

[51] Int. Cl................................................G06k 9/08

[58] Field of Search........235/197; 340/146.3, 172.5; 179/1 SA

[56] References Cited

UNITED STATES PATENTS

| | | | |
|---|---|---|---|
| 3,517,386 | 6/1970 | Jones | 340/146.3 F |
| 3,074,634 | 1/1963 | Gamo | 340/146.3 |
| 3,440,617 | 4/1969 | Lesti | 340/146.3 X |
| 3,492,647 | 1/1970 | Otten et al. | 340/146.3 |
| 3,205,347 | 9/1965 | Wright | 235/197 |
| 3,413,602 | 11/1968 | Horwitz et al. | 340/146.3 |
| 3,292,148 | 12/1966 | Giuliano et al. | 340/146.3 |

*Primary Examiner*—Maynard R. Wilbur
*Assistant Examiner*—Leo H. Boudreau
*Attorney*—Robert E. Burns and Emmanuel J. Lobato

[57] ABSTRACT

Pattern identification systems wherein $N$ number of different "standard patterns" are prepared for each "reference pattern," and whether a given input pattern belongs to the category of the reference pattern or not is determined according to whether a value of the sum of the squares of $N$ number of different similarities of the input pattern to the standard patterns, or a value of the square root thereof, exceeds or falls short of a predetermined maximum.

6 Claims, 9 Drawing Figures

PATTERN IDENTIFICATION SYSTEMS OPERATING BY THE MULTIPLE SIMILARITY METHOD

BACKGROUND OF THE INVENTION

This invention relates to pattern identification systems. The prior art pattern identification systems have been founded mostly upon the "pattern matching" scheme, wherein the identity of a given input pattern is established according to the degree of its similarity to a specific reference pattern. To explain this in further detail, let $f(x)$ be the input pattern and $f_o(x)$ the reference pattern, $x$ being defined in a region R. The similarity $S[f,f_o]$ that may exist between $f(x)$ and $f_o(x)$ can be written as $$S[f,f_o]=\frac{(f,f_o)}{||f||\,||f_o||} \quad (1)$$

where $(f, f_o)$ is the linner scalar product of $f(x)$ and $f_o(x)$ and is defined by $$(f,f_o)=\int_R f(x)f_o(x)dx \quad (2)$$

and $||f||$ is the norm of $f(x)$ and a positive value defined by $$||f||=\sqrt{(f,f)} \quad (3)$$

Now, generally, the values of the similarity $S[f, f_o]$ will be in the range of $$-1\leqq S[f,f_o]\leqq 1 \quad (4)$$

Especially, when $f(x)$ is identical with $f_o(x)$, $$\lim_{f(x)\to f_o(x)} S[f,f_o]=1 \quad (5)$$

Consider now a certain small number $\epsilon$ which is greater than zero. It may be regarded, according to the aforesaid pattern matching scheme, that $f(x)$ belongs to the category of $f_o(x)$ if the relation $$S[f,f_o]>1-\epsilon \quad (6)$$

is satisfied and that $f(x)$ does not belong to the category of $f_o(x)$ if not.

Since the similarity $S[f,f_o]$ is kept at constant value if $f(x)$ is replaced by $Af(x)$ (where $A$ is an arbitrary constant), the pattern matching scheme based upon the degree of similarity as above may be considered a convenient form of pattern identification in so far as those patterns are concerned which will remain essentially unaffected by such a change. Practically, however, patterns are usually subject to other various light deformations due to varieties of causes, so that a value of $\epsilon$ cannot possibly be made sufficiently small if it is to be selected so as to satisfy the formula 6 for all patterns to be regarded as belonging to one and the same category. The above fact may also lead to the inverse result that the formula 6 is satisfied even for those patterns which have to be excluded from the category.

The present invention has been made with a view to eliminating the foregoing difficulties attendant to the prior art.

SUMMARY OF THE INVENTION

A principal object of the invention is to provide pattern identification systems having improved discrimination for patterns in different category.

The other objects of the present invention, as well as the characteristic features thereof, will become apparent as the invention is further clarified by the description given hereinbelow.

By way of explanation of the fundamental concepts of the invention, in more specific aspects thereof, consider $K$ number of different categories. A pattern $f(K)_{(}X)$ having $N-1$ number of different slight deformations with regard to $k$th reference pattern $f_o^{(k)}(x)$ can generally be expressed by the equation $$f^{(k)}(x)=f_o^{(k)}(x)+\sum_{n=1}^{N-1}\alpha n^{(k)}g_n^{(k)}(x)\ k=1,2,...K) \quad (7)$$

where each $g_n^{(k)}(x)$ is the component of a linearly independent deformed pattern and $\alpha_n^{(k)}$ is a parameter representing the magnitude of the deformation component. It should be noted here that the formula 7 holds true when each $\alpha_n(k)$ is sufficiently small.

Suppose that, with regard to $N$ number of different patterns $f_o(^k)(x), g_1(^k)(x), g_{N-1}{}^{(k)}(x)$, $N$ number of different standard functions as defined as $$\varphi_m^{(k)}=\sum_{n=0}^{N-1}\beta_{mn}^{(k)}g_n^{(k)}(x)\ \begin{pmatrix}g_o^{(k)}(x)\equiv f_o^{(k)}(x)\\ m=1,2\ldots N\\ k=1,2,\ldots K\end{pmatrix} \quad (8)$$

and that $\{\beta_{mn}^{(k)}\}$ is determined so as to satisfy the relation $$(\varphi_m^{(k)},\varphi_{m'}^{(k)})=\begin{cases}1\ (m=m')\\ 0\ (m\neq m')\end{cases} \quad (9)$$

The above Formula (7) can now be rewritten as $$f^{(k)}(x)=\sum_{m=1}^{N}C_m^{(k)}\varphi_m^{(k)}(x) \quad (10)$$

and a value of each expansion coefficient $C_m^{(k)}$ is obtainable according to the equation $$C_m^{(k)}=(f^{(k)},\phi_m^{(k)})\ (m=1,2,\text{-----},N) \quad (11)$$

Although $C_m^{(k)}$ assumes various values as a function with respect to parameters $\alpha_1^{(k)}, \alpha_2^{(k)}, \text{----}\alpha_{N-1}^{(k)}$, the relation $$||f^{(k)}||2=\sum_{m=1}^{N}\{C_m^{(k)}\}=\sum_{m=1}^{N}(f^{(k)},\varphi_m^{(k)})^2 \quad (12)$$

$$0\leqq S^*[f,f_o^{(k)}]\leqq 1$$

is satisfied with respect to any pattern $f(x)$ defined by the formula 7.

Therefore, if the multiple similarity $S^*[f,f_o^{(k)}]$ of any given pattern $f(x)$ to the reference pattern $f_o^{(k)}(x)$ is defined by $$S^*[f,f_o^{(k)}]=\sqrt{\sum_{m=1}^{N}\{S[f,\varphi_m^{(k)}]^2}(k=1,2,\ldots,K)$$

then the values of $S^*[f,f_o^{(k)}]$ will be in the range of $$0\quad S^*[f,f_o^{(k)}]\quad 1 \quad (14)$$

Specifically, if the pattern $f(x)$ belongs to the $k$th category as defined by the formula 7, $S^*[f,f_o^{(k)}]=1$. Hence, with regard to a certain small positive member $\epsilon$, whether the pattern $f(x)$ belongs to the category of the reference pattern $f_o^{(k)}(x)$ or not will be decided according to whether the relation $$S^*[f,f_o^{(k)}]>1-\epsilon \quad (15)$$

is satisfied or not. This type of pattern identification provides a type of the aforementioned pattern matching scheme.

If $N = 1$ in the above pattern identification method based upon multiple similarity, this method conforms to the ordinary similarity-based identification method. It will accordingly be seen that the former method is a substantial outgrowth of the latter method. Since a general pattern $f(x)$ not belonging to the category of the reference pattern $f_o^{(k)}(x)$ usually includes components other than $\phi_1^{(k)}(x)$, $\phi_2^{(k)}(x)$, ---- $\phi_N^{(k)}(x)$, in that case the formula 12 does not hold true. Instead, $$||f||^2 > \sum_{m=1}^{N} \{C_m{}^k\}^2 \qquad (16)$$

Then the relation of the formula 15 is not satisfied, either, so that it is concluded that the pattern $f(x)$ does not belong to the category of the reference pattern $f_o^{(k)}(x)$.

Practically, in identification of a pattern such as a letter and numerical figure, for example, the aforesaid region $R$ of $x$ will be a two-dimensional plane, with $x$ representing a two-dimensional position vector therein and $f(x)$ representing a function to define the intensity (e.g. density) of the pattern at the position $x$. In identification of a vocal pattern, on the other hand, $x$ will represent a vector in a coordinate plane with the two axes thereof respectively representing time and frequency, and $F(x)$ will represent a function to define loudness at a specific time and in a specific frequency band.

Having thus outlined the fundamental concepts of the present invention, description will now be given on some preferred examples of the pattern identification system of the invention with reference to the attached drawings.

BRIEF DESCRIPTION OF THE DRAWINGS

In the drawings:

FIG. 1($b$) is a schematic circuit diagram of another embodiment of the invention, wherein the above computations are carried out by electrical circuit means by being equivalently converted into those of summation and multiplication;

DESCRIPTION OF THE PREFERRED EMBODIMENTS

Figure 1:
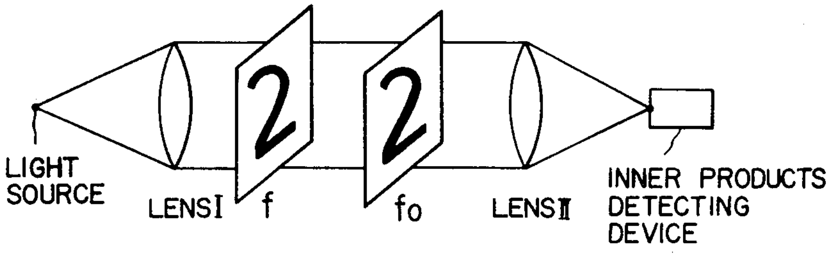
FIG. 1($a$) is a schematic diagram showing the configuration of an embodiment of the present invention, wherein the computations for obtaining the scalar products of vectorial quantities required in the pattern identification systems of the invention are carried out by optical filter means.
Figure 1:
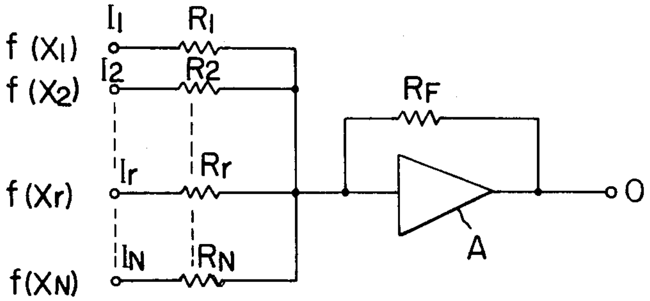

In the arrangement described herein, the desired computations for obtaining the scalar products of vectorial quantities may be carried out by the use of optical filter means, as illustrated schematically in FIG. 1($a$) by way of example. In this case, integral calculations will be necessary according to the formula 2, given earlier in this specification, with an input pattern represented by $f$ and reference pattern by $f_o$. For executing the above computations by means of an electrical circuit, since the information contained in a diagrammatic pattern on the two-dimensional region $R$ can be represented by a group of values of $f(x)$ at a finite number of sample points $\{x_r\}$ chosen in accordance with the well known sampling theorem, the formula 2 can be rewritten into the following formula according to which only multiplication and summation are required to obtain identical results:

$$(f, f_o^{(k)}) = \Sigma_r f(x_r) f_o^{(k)}(x_r) \qquad (k=1,2,\text{----}\ K) \quad (17)$$

The computations according to this formula 17 can now be carried out by means of an electrical circuit illustrated diagrammatically in FIG. 1($b$) as an example. In the configuration of this drawing, the ratio $R_F/R_r$ between two electrical resistances $R_F$ and $R_r$ therein is set at a value of a point of a preselected standard pattern $f_o^{(k)}(x_r)$ while the amplification factor of an amplifier is made sufficiently large. If, under these conditions, voltage in proportion to input pattern value $f(x_r)$ is supplied to the circuit from an input $I_r$, the following relation is obtained at an output terminal $Q$ in accordance with the principle of the well known analog summing amplifier circuit:

$$\underline{0} = \sum_r \frac{R_{F_f}}{R_r}(x_r) = \sum_r f(x_r) f_o^{(k)}(x_r) \qquad (a)$$

from which the formula 17 is computable.

From the formulas 13 and 15, the relation $$\sqrt{\sum_{m=1}^{N} (f,\ \varphi_m{}^{(k)})^2} (1-\epsilon)||f||(k=1,\ 2,\ .\ .\ .,\ K)$$

or $$\sum_{m=1}^{N} (f, \phi_m{}^{(k)})^2 > (1-\epsilon')||f||^2 (k=1,2\ .\ .\ .\ ,K) \qquad (19)$$

is obtained. Since, $N$ number of different functions $\phi_1^{(k)}, . . . \phi_N^{(k)}$ satisfying the formulas 8 and 9 can be computed beforehand for respective reference patterns, these can be regarded as fixed coefficients in concrete pattern identification systems.

Figures 2, 4:
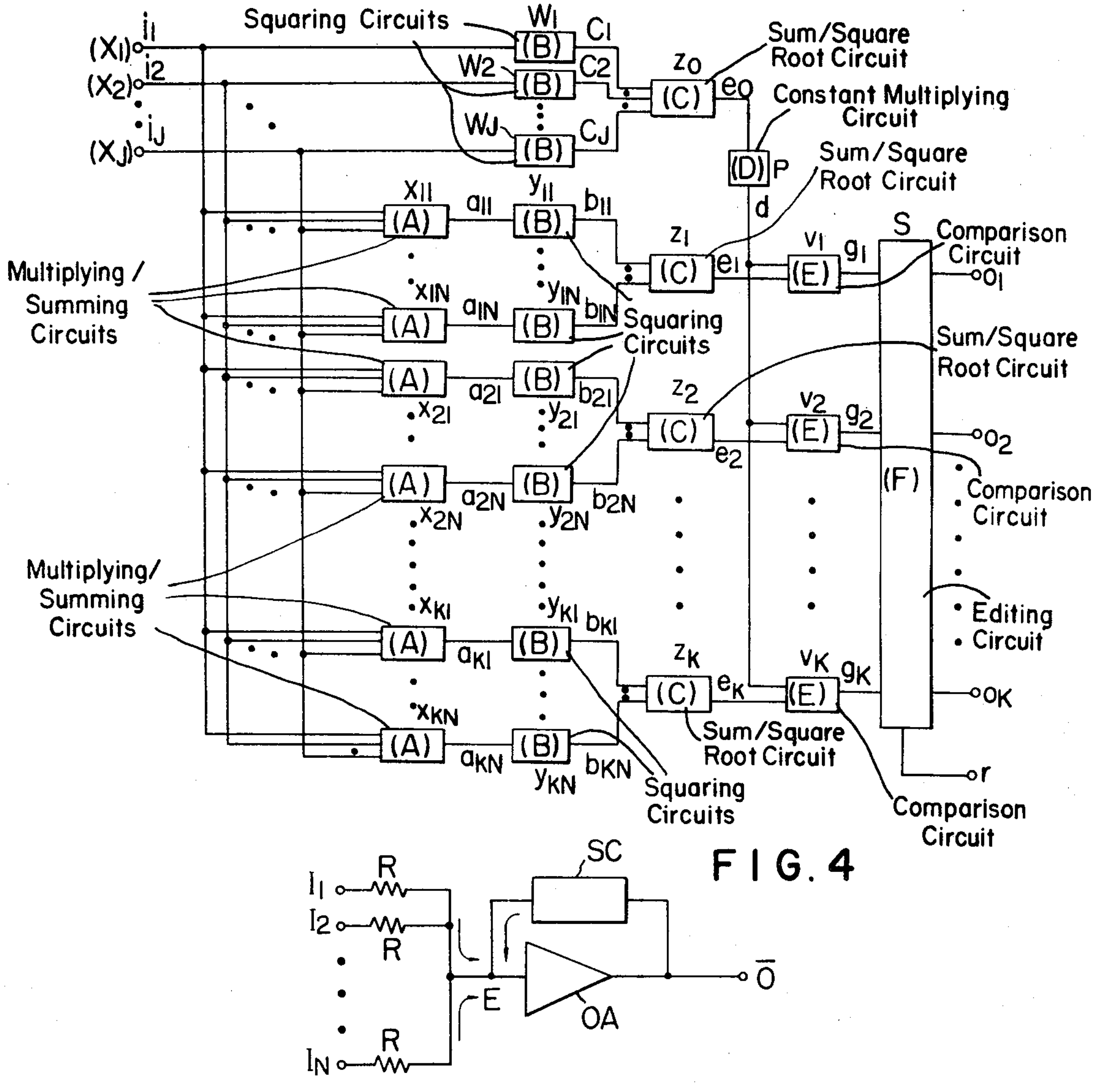
FIG. 2 is a block diagram of a pattern identification system in accordance with the present invention.
FIG. 4 is a diagram showing the configuration of an example of circuits for computing square roots of weighted sum of inputs in FIG. 2, in which is utilized the squaring circuit of FIG. 2.

FIG. 2 illustrates the configuration of a typical example of the pattern identification system described herein. In this drawing, the circuits (hereinafter referred to as the "multiplying/summing circuits") for conducting the above equivalently converted multiplying and summing computations to obtain the aforementioned scalar products (as illustrated in FIG. 1($b$) by way of example) are marked $A$, while the circuits (hereinafter referred to as the "squaring circuits") for conducting squaring computations are marked $B$. A concrete example of these circuits $B$ is illustrated in detail in FIG. 3. Further the reference character $C$ indicates circuits (hereinafter referred to as the "-sum/square root circuits") capable of conducting computations for obtaining sums and their square roots (an example of these circuits $C$ is illustrated in detail in FIG. 4), D indicates a constant multiplying circuit, $E$ indicates comparison circuits and F indicates an editing circuit (examples of these circuits D, $E$ and F are illustrated in detail in FIGS. 5, 6 and 7, respectively).

Appropriately sampled, each input pattern may be fed into the pattern identification system of FIG. 2 from its inputs $i_1$,---- $i_2$, ---- $i_r$, ---- $i_J$ as a group $[f(x_r)\ ]$ of values of an input pattern as mentioned already. These inputs $i_1$, ---- $i_J$ are respectively connected to J number of input terminals of the multiplying/summing circuits $A$. $x_{1l}$,------ $x_{1N}$ indicate a group of circuits for conducting the multiplying and summing computations with respect to the functions of the input pattern supplied and $N$ number of functions $\phi_1^{(1)}$, ---- $\phi_N^{(1)}$ of a first reference pattern. Output signals carrying the results of these computations appear at output terminals $a_{1l}$,---- $a_{1N}$ of this group of circuits. Similar computations are effected with respect to $N$ number of functions of each of the remaining reference patterns.

The outputs $a_{1l}$, ---- $a_{1N}$, $a_{2l}$, ---- $a_{2N}$, ---- $a_{kl}$, ---- $a_{kN}$ of the multiplying/summing circuits are respectively connected to the inputs of the squaring circuits $y_{1l}$, ---- $y_{1N}$, $y_{2l}$--$y_{2N}$, $y_{kl}$, ---- $y_{kN}$, while the outputs $b_{1l}$, ---- $b_{1N}$, $b_{2l}$, ---- $b_{2N}$, ---- $b_{kl}$, ---- $b_{kN}$ of these squaring circuits are combined into groups corresponding to the respective reference patterns, each of the groups being connected to each of the sum/square root circuits $z_1$, $z_2$, ---- $z_k$. More specifically, for the first reference pattern, the outputs $b_{1l}$, ---- $b_{1N}$ are connected to the sum/square root circuit $z_1$, and so forth. Hence an electrical signal corresponding to the left side of the formula 18 will be obtained at each of the outputs $e_1$, $e_2$, ---- $e_k$ of the sum/square root circuits.

Also the input signals supplied from the inputs $i_1$, ---- $i_J$ are directed to the inputs of another set of squaring circuits $W_1$, ---- $W_J$, thereby to compute $\{f(x_r)\}^2$. The outputs $c_1$, ---- $c_J$ of these squaring circuits are connected to a sum/square root circuit $z_0$, so that a signal corresponding to a value of $\sqrt{(f \cdot f)}$ is obtained at the output $e_O$ of this circuit $z_O$. As defined by the formula 3, this output signal is equivalent to the norm $||f||$ of the input pattern supplied.

The output $e_O$ of the circuit $z_O$ is connected to the input of a constant multiplying circuit $p$, so that the output $d$ of this circuit $p$ supplies a signal corresponding to the product of the norm $||f||$ multiplied by a constant coefficient corresponding to a value of $(1-\epsilon)$ on the right side of the formula 18. Hence this output signal will carry information corresponding to a value of the right side of the formula 18.

Now this output signal is compared with the respective signals obtained at the outputs $e_1$, $e_2$, ---- $e_k$, which carry intelligence corresponding to the left side of the formula 18, by means of the respective comparison circuits $v_1$, $v_2$, ---- $v_k$, thereby to detect a signal or signals which satisfy the inequality of the formula 18. Each of the comparison circuits $v_1$, ---- $v_k$ includes a maximum value detecting circuit for supplying a digital output "1" when the signals supplied thereto satisfy the formula 18, thereby to manifest whether the input pattern $f$ supplied belongs to the category of the specific reference pattern or not. The outputs $g_1$, $g_2$, ---- $g_k$ of the comparison circuits are connected to the editing circuit $S$. In event two or more of the outputs of the comparison circuits supply output "1" so that the identification system is incapable of making a definite response, or in event none of the outputs supplies output "1" so that the input pattern is unidentifiable, an output $r$ of the editing circuit $S$ supplies an "identification rejected" output. In other cases, where the input pattern has been identified as belonging to the category of only one of the reference patterns, the identity of that input pattern is exhibited at one of the outputs $0_1$, $0_2$, ---- $0_k$ which corresponds to that one reference pattern.

Figure 3:
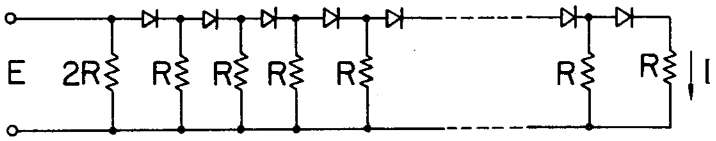
FIG. 3 is a diagram showing the configuration of an example of squaring circuits in FIG. 2.

FIG. 3 illustrates an example of the squaring circuits given in FIG. 2. According to this particular circuit configuration, a plurality of diodes are interconnected in series, with a plurality of resistances $R$ interposed alternatingly to form a ladder network. The resistances $R$ are commonly interconnected at one end thereof, and a compensation resistance $2R$ (two times more resistive than the other resistances $R$) is connected between the two inputs of the circuit. The following relations exist in this circuit:

$$I = nE_d/2R + (n-1)E_d/R + \text{----} + E_d/R = n^2E_d/2R \quad (b)$$

$$E = nE_d,\ n = 1,2,\text{----}$$

where $E$ is the input voltage, $I$ is the current flowing through the circuit, and $E_d$ is the forward voltage drop of one diode. Eliminating $n$ from the above equations, $$I = \left(\frac{1}{2RE_d}\right)E^2$$

It will now be seen that the current $I$ flowing through the circuit of FIG. 3 is proportionate to the square of the input voltage $E$. (*Considered graphically, this means approximation to the characteristic curve of the squares with broken lines. Actually, however, the diodes do not show ideal broken line characteristics but exponential function characteristics, so that the squaring circuit will have a still better degree of approximation.*)

FIG. 4 illustrates an example of the sum/square root circuits described above in connection with FIG. 2. According to this particular example, in which is utilized the above mentioned squaring circuit as seen in the drawing, inputs $I_1$, $I_2$ ---- $I_J$ are commonly connected to the well known operational amplifier (amplification factor $A$) $0A$ through their respective resistances $R$ in order to obtain the sum and then the square root of input signals. If the input voltage of the operational amplifier is $E$ and its output voltage 0, the operational amplifier is controlled in such a manner that a current value at the input of the amplifier becomes zero (this technique belongs to the prior art). Now, if the input voltage of the squaring circuit SC is $\bar{0}$, the output current thereof is $B \cdot \bar{0}^2$ ($\underline{B}$ being a constant), as is obvious from the foregoing explanation made with reference to FIG. 3, so that $$\frac{E-I_1}{R} + \frac{E-I_2}{R} + \cdots + \frac{E-I_N}{R} + B \cdot \bar{0}^2 = 0 \qquad (d)$$

$$A \cdot E = \bar{0}$$

If $E$ is eliminated from the above equations, $$1/R\,(I_1+I_2+\text{------}+I_N)=B\cdot\bar{O}^2-(N\cdot\bar{O}/R\cdot A) \quad (e)$$

The second term of the right side of the preceding equation can be reduced to a negligible value if the amplification factor $A$ of the operational amplifier is made sufficiently large. Hence, if $B=1/R$, $$\bar{O}=\sqrt{(I_1+I_2+\ldots+I_N)} \quad (f)$$

Accordingly the square root of the sum of the input signals is obtained at an output $\bar{O}$ of the circuit.

Figure 5:
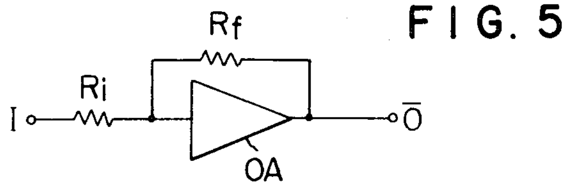
FIG. 5 is a diagram showing the configuration of an example of constant multiplying circuit in FIG. 2.

FIG. 5 illustrates an example of the constant multiplying circuit given in FIG. 2, wherein the well known operational amplifier $0A$ is also utilized. The desired constant is determined by the ratio $R_f/R_i$ where $R_i$ represents the input resistance and $R_f$ represents the feedback resistance of the operational amplifier. Further there is existent between the input voltage $I$ and the output voltage $\bar{O}$ of this circuit the relation $$\bar{O}=(R_f/R_i)\cdot I \quad (g)$$

The aforesaid constant is now obtainable if $(R_f/R_i)=1-\epsilon$.

Figure 6:
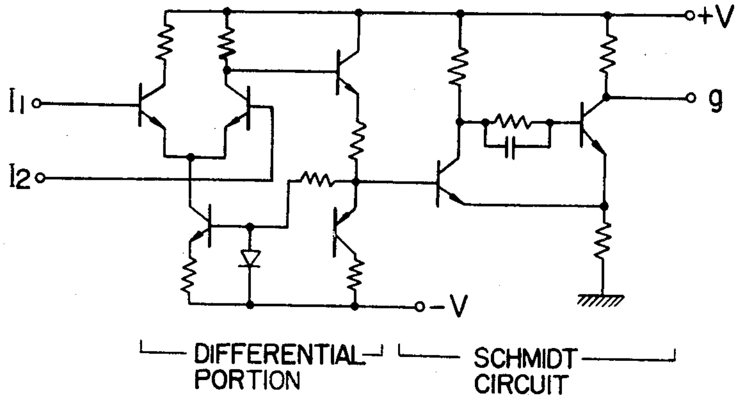
FIG. 6 is a diagram showing the configuration of an example of comparison circuits in FIG. 2.

FIG. 6 illustrates an example of the comparison circuits given in FIG. 2. Broadly, this particular example is comprised of a differential amplifier portion and a so-called Schmidt circuit portion, and a difference between the signals supplied into the comparison circuit from its inputs $I_1$ and $I_2$ is detected and amplified. If that difference is found positive, the Schmidt circuit will supply output "1" saturated in positive potential; if it is negative, the circuit will supply output "0" of zero potential. Therefore, if the input $I_1$ is connected with one of the aforementioned outputs $e_1$, $e_2$, ---- $e_k$ of the sum/square root circuits $z_1$, $z_2$, --- $z_k$ given in FIG. 2, thereby to supply a signal corresponding to the left side of the formula 18, and if the other input $I_2$ is connected with the output $d$ of the constant multiplying circuit $p$ given also in FIG. 2, thereby to supply a signal corresponding to the right side of the formula 18, the comparison circuit of FIG. 6 may be made to supply output "1" only when the formula 18 is satisfied.

Figure 7:
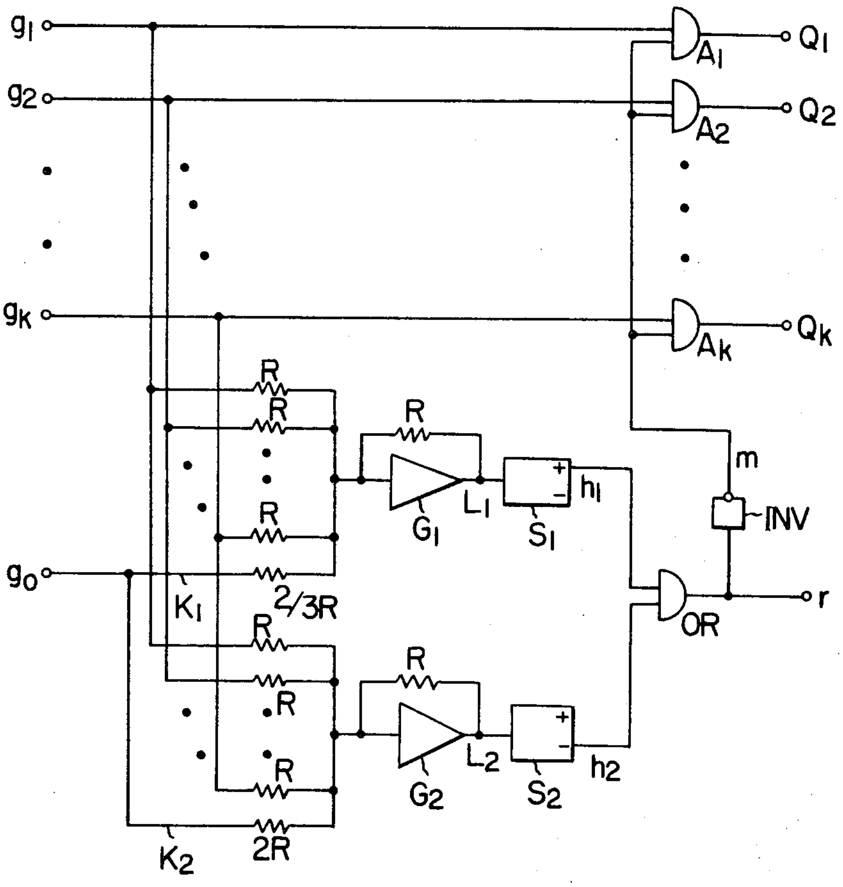
FIG. 7 is a diagram showing the configuration of an example of an editing circuit in FIG. 2.

FIG. 7 illustrates an example of the editing circuit explained already with reference to FIG. 2. According to this particular example, two multiplying/summing circuits illustrated in FIG. 1($B$) are incorporated, thereby to ascertain whether or not at least two of inputs $g1$, --- $g2$, $g_k$ have been supplied with signals "1." The input signals so supplied will be either "1" or "0." Input signal supplied from the input $g_0$ is constantly "−1." The inputs $g_1$, $g_2$, ---- $g_k$ are connected with resistances of $R$ (in ohms), a terminal $k_1$ with a resistance of $2/3\,R$ (in ohms), a terminal $k_2$ with a resistance of $2R$(in ohms), and operational amplifiers $G_1$and $G_2$ with feedback resistances of $R$ (in ohms), respectively. Hence, in accordance with the well known operations of the multiplying/summing circuits, there are obtained at output s $I_1$ and $I_2$ of the operational amplifiers $G_1$ and $G_2$ $$I_1=(g_1+g_2+\text{----}g_k)+(3/2\,g_0\,g_i=(0\text{ or }1) \quad (h)$$

$$I_2=(g_1+g_2+\text{----}g_k)+g_0\,g_0=½1$$

The output $I_1$ is positive when signals "1" are supplied to two or more of the inputs $g_1$, $g_2$, $g_k$, and the output $I_2$ is negative only when signals "0" are supplied to all of these inputs. The outputs $I_1$and $I_2$ are connected to the aforesaid Schmidt circuits $S_1$ and $S_2$, respectively. It is easy to provide each of these Schmidt circuits with two different output terminals, i.e., a (+) terminal generating output "1" when the input supplied is positive and a (−) terminal generating output "1" when negative. If the (+) terminal of the Schmidt circuit $S_1$and the (−) terminal of the other Schmidt circuit $S_2$ are connected to an OR circuit as in FIG. 7, the output $r$ thereof can be caused to produce output "1" only when signals "1" are supplied to two or more of the inputs $g_1$, $g_2$ ----$g_k$ or when signal "1" is supplied to none of these inputs, i.e. only in the event of "identification rejected". Further, by inverting the signal of the output $r$ by means of an inverting circuit INV, an output terminal $m$ will have signal "1" when identification is not rejected, i.e., when an input pattern fed into the system is definitely identified. By applying this signal to AND gates $A_1$, $A_2$, ---- $A_k$, and by accordingly controlling the input signals supplied from the inputs $g_1$, $g_2$, ---- $g_k$, outputs $0_1$, $0_2$, ... $0_k$ will always produce only one definite result of identification for each input pattern.

In the arrangement described herein, $N$ number of different slight deformations to be included in respective reference patterns are compensated for according to the formula 7 for each of the reference patterns. This compensation has to be made differently for each reference patterns because different reference pattern have each a particular set of $N$ number of different slight deformations to be included therein. As a result, in the pattern identification scheme based upon multiple similarities, $\epsilon$ will assume a positive value only when deformation in excess of the permitted range of compensation has been allowed to be included in a reference pattern. Stated conversely, if such deformation is within a certain allowable range, it is possible to keep a value of $\epsilon$ sufficiently small whenever an input pattern supplied belongs to the category of a particular reference pattern. Any prior art known to the present applicant is unable to cope with deformations that vary according to different reference patterns, thereby suffering greatly deteriorated discriminating power with respect to more or less deformed input patterns.

Another pattern identification system in accordance with the present invention can be configured on the basis of the formula 19 if so-called adder circuits are substituted for the sum/square root circuits $C$ of FIG. 2. It will be readily understood that an adder circuit is obtained if the squaring circuit disposed in a feedback path of the sum/square root circuit illustrated in detail in FIG. 4 is replaced with an electrical resistance $R$. In the precedingly described embodiment of the invention, given input patterns have been sampled in accordance with the prior sampling theorem, and the integrating computations needed to obtain the desired scalar products with connection to such sampled input patterns have been converted into equivalent multiplying and summing computations so as to be carried out in electrical circuit means. The above scalar products, however, are obtainable by optical filter means as described already with reference to FIG. 1($a$). Regarding the aforementioned squaring circuits, adder circuits, sum/square root circuits, comparison circuits and editing circuit, too, some arithmetic units can be materialized by means other than electrical circuits. Further, the norm $||f||$ of input pattern $f(x)$ in the formulas 18 and 19 may be dispensed with since it is compared commonly with the outputs of $K$ number of the sum/square root circuits or adder circuits $Z_1$, $Z_2$, ---- $Z_k$ (in FIG. 8). As mentioned already, the multiple similarity $S^*[f,f_0^{(k)}]$ has some value in the range satisfying the formula 14 and, especially when a given input pattern is identical with one of the reference patterns, assumes the maximum value 1. Since $||f||$ is common to any value of $k$ in the multiple similarity (defined earlier by the formula 13), $$S^*[f,f_0^{(k)}]=\sqrt{\frac{\sum_{m=1}^{N}(f,\varphi_m^{(k)})^2}{||f||^2}}\quad(k=1,2,\ldots,K) \tag{i}$$

it will follow that, by detecting a value of $k$ which maximizes $$\sum_{m=1}^{N}(f,\varphi_m^{(k)})^2$$

the input pattern supplied is identifiable as belonging to the *kth* reference pattern.

Figure 8:
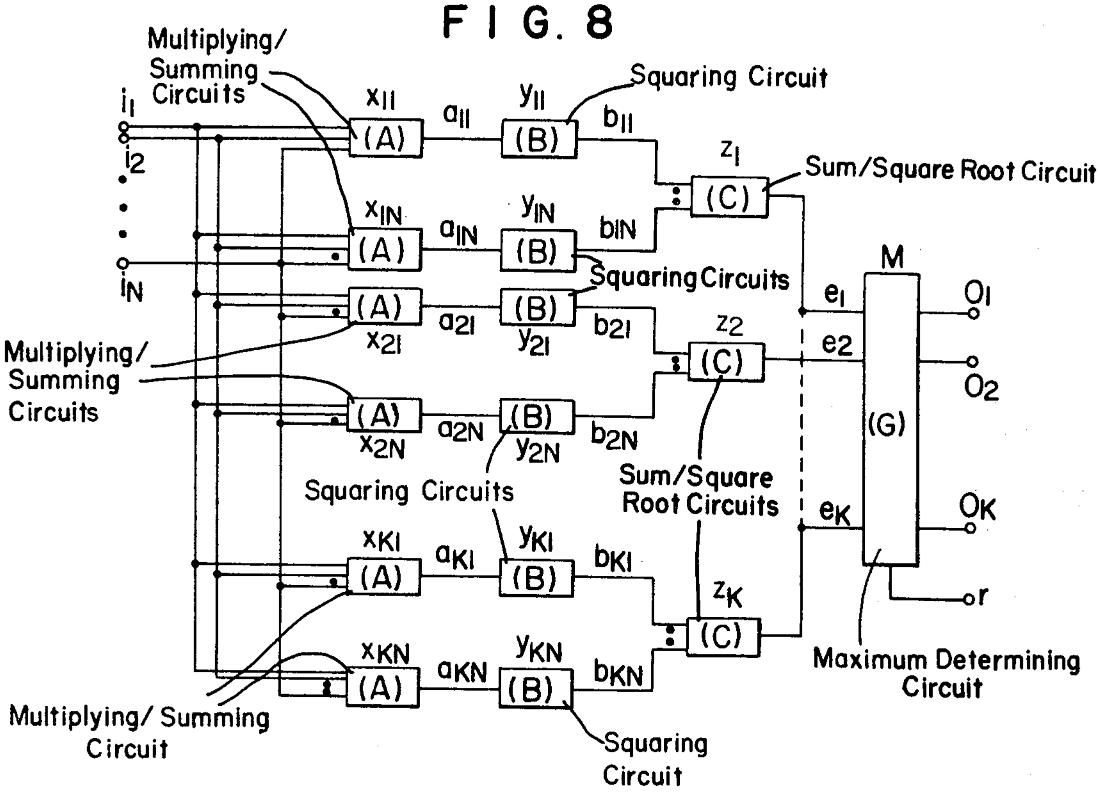
FIG. 8 is a block diagram of another pattern identification system in accordance with the present invention.

From these considerations, the second pattern identification system has been materialized by modifying the configuration of FIG. 2 into the one illustrated schematically in FIG. 8. In this second system, multiplying/summing circuits $X_{11}$, ---- $X_{1N}$, $X_{Kl}$, ----$x_{kN}$ and squaring circuits $y_{11}$, ---- $y_{1N}$, $y_{kl}$, ---- $y_{kN}$ remain substantially the same as in FIG. 2, while adder circuits $z_1$, ---- $z_k$ are provided in place of the sum/square root circuits of FIG. 2. The outputs $e_1$, ---- $e_k$ of these adder circuits are connected to a maximum determining circuit G, which is caused to produce an output signal at one of its output terminals $0_1$, ---- $0_k$ which corresponds to that one of the outputs $e_1$, ---- $e_k$ which has the maximum value. This editing circuit detects the maximum value $m$ of input signals representing the capital K number of sums, then proceeds at output signal "1" at the every output terminals corresponding to the input signals of which value is larger than ( $m(1+\epsilon)$ ). A suitable editing circuit of this type is disclosed for example in FIG. 4 of Japanese Pat. Publication No. 19044/65.)

In case $N-1$ number of different slightly deformed patterns $g_n^{(k)}(x)$ to be included in reference pattern $f_0^{(k)}(x)$ are not necessarily linearly independent, the total number $M$ of different standard functions $\phi_n^{(k)}(x)$ having normal orthogonality as defined by the formula 9 will be: $M>N$.

Consider the other case wher M>N. Since $\{V_{mn}\}$ satisfying the relation $$\sum_{m=1}^{M}V_{mn}V_{mn'}=\begin{matrix}1(n=n')\\0(n\neq n')\end{matrix}\quad(n,n'=1,2,\ldots,N) \tag{20}$$

is obtainble, it follows that, if $$b_m^{(k)}=\sum_{n=1}^{N}V_{mn}C_n^{(k)}\qquad(m=1,2,\ldots,M)$$
$$\varphi_m^{(k)}=\sum_{n=1}^{N}V_{mn}\varphi_{n'}^{(k)}(x) \tag{21}$$

the For mula (10) can be rewritten as $$f(x)=\sum_{m=1}^{M}b_m^{(k)}\psi_m^{(k)}(x) \tag{22}$$

Further, since the expansion coefficient $b_m^{(k)}$ in this instance is, from the Formulas (11) and (21), $$b_m^{(k)}=(f,\psi_m^{(k)})\;(m=1,2,\ldots,M \tag{23}$$

it will be understood that $M$ number of standard functions $\{\psi_m^{(k)}\}$ can be selected anew instead of the $N$ number of standard functions $\{\varphi_n^{(k)}\}$.

Furthermore, from the Formulas (20) and (21), the relation $$\sum_{m=1}^{M}\{b_m^{(k)}\}^2=\sum_{m=1}^{M}\sum_{n=1}^{N}V_{mn}C_n^{(k)}\sum_{n'=1}^{N}V_{mn'}C_{n'}^{(k)}$$

is obtainable. Combined with the Formula (12), this relation provides the result $$||f||^2=\sum_{m=1}^{M}\{b_m^{(k)}\}^2 \tag{24}$$

This Formula (24) verifies the fact that the expansion coefficient $\{b_m^{(k)}\}$ for the newly selected standard functions $\{\psi^{(k)}\}$ works substantially the same as the expansion coefficient $\{C_n^{(k)}\}$ for the precedingly discussed standard functions $\{\varphi_n^{(k)}\}$.

What deserves attention at this moment, however, is $$(\psi_m^{(k)},\psi_{m'}^{(k)})=\sum_{n=1}^{N}\sum_{n'=1}^{N}V_{mn}V_{m'n'}(\varphi_{n'}^{(k)},\varphi_{n'}^{(k)})$$
$$=\sum_{n=1}^{N}V_{mn}V_{m'n}\neq\begin{cases}1\,(m=m')\\0\,(m\neq m')\end{cases} \tag{25}$$

so that the new standard functions $\{\psi_m^{(k)}\}$ do not necessarily show orthogonal relationship.

It will now be seen that by selecting the standard functions $\{\psi_m^{(k)}\}$ which satisfy the Formula (22), the expansion coefficient $\{b_m^{(k)}\}$ thereof will satisfy the Formula (24). In this instance, however, $M$ may not necessarily be equal to $N$, nor the standard functions always be in orthogonal relationship.

Although the present invention has been shown and described in the foregoing with connection to certain specific embodiments thereof, it is assumed that the invention is not to be restricted thereby but includes modifications, substitutions and changes in accordance with its fundamental concepts outlined earlier in this specification or within its scope as defined by the appended claims.

What is claimed is:

1. A pattern identification system wherein $N$ number of different standard patterns, $N$ is not smaller than three, are prepared for each of $K$ number of different reference patterns with one of which a given input pattern is to be identified, comprising means for obtaining the inner products of the input pattern and each of said $N$ number of standard patterns of each of said $K$ number of reference patterns, means for obtaining the squares of each of the above obtained $N\times K$ number of inner products, means for obtaining a sum of all $N$ number of the above obtained squares for each of said $K$ number of reference patterns, and means for identifying said input pattern with one of said $K$ number of reference patterns by selecting one of the above obtained $K$ number of sums which has a maximum value.

2. A pattern identification system as claimed in claim 1, in which said identification rejecting means comprises a first circuit which produces output "1" when not less than two of its input signals respectively representing said sums have equally a maximum value, a second circuit which produces output "1" when none of said input signals has a maximum value, and an OR circuit through which the outputs of said first and said second circuits are transmitted, said first circuit comprising a plurality of resistances respectively connected to a plurality of input terminals, another resistance connected to another input terminal to which is always applied a constant signal, an operational amplifier to which is commonly connected the other ends of all the said resistances, a feedback resistance connected between the output and input of said operational amplifier, and a Schmidt circuit producing output "1" when an input signal supplied by said operational amplifier is positive, said plurality of resistances having the same ohmic value, said other resistance having an ohmic value different from the ohmic value of said plurality of resistances, said feedback resistance having the same ohmic value as said plurality of resistances.

3. A pattern identification system as claimed in claim 2, in which the ohmic values of each of said plurality of resistances, said other resistance and said feedback resistance are approximately in the 1:2/3:1 ratio.

4. A pattern identification system as claimed in claim 1, in which said second circuit comprises a plurality of resistances respectively connected to a plurality of input terminals, said plurality of resistances having the same ohmic value, another resistance connected to another input terminal to which is always applied a constant signal, said other resistance having an ohmic value different from the ohmic value of said plurality of resistances, an operational amplifier to which is commonly connected the other ends of all the said resistances, a feedback resistance connected between the output and input of said operational amplifier, said feedback resistance having the same ohmic value as said plurality of resistances, and a Schmidt circuit producing output "1" when an input signal supplied by said operational amplifier is negative.

5. A pattern identification system as claimed in claim 4, in which the ohmic values of each of said plurality of resistances, said other resistance and said feedback resistance are approximately in the 1:2:1 ratio.

6. A pattern identification system wherein $N$ number of different standard patterns are prepared for each of $K$ number of different reference patterns with one of which a given input pattern is to be identified, comprising means for obtaining the inner product of the input pattern and each of said $N$ number of standard patterns of each of said $K$ number of reference patterns, means for obtaining the square of each of the above obtained $N \times K$ number of inner products, means for obtaining the square roots of the sums of all $N$ number of the above obtained squares for said $K$ number of reference patterns, means for obtaining the norm of the input pattern, means for multiplying said norm of the input pattern by a constant coefficient, and means for comparing between the above obtained product of said norm of the input pattern and the constant coefficient and the above obtained square roots corresponding to said $K$ number of reference patterns, said means for obtaining the square roots of the sums of all $N$ number of the precedingly obtained squares for said $K$ number of reference patterns being formed by a plurality of electrical circuits each comprising an amplifier having a high amplification factor, a plurality of resistances having substantially the same ohmic value and through which electrical signals representing the values of said squares are directed to the input of said amplifier, and a squaring circuit connected between the output and input of said amplifier.

* * * * *